United States Patent
Manousakis et al.

(10) Patent No.: US 11,650,654 B2
(45) Date of Patent: May 16, 2023

(54) MANAGING POWER RESOURCES FOR POOLS OF VIRTUAL MACHINES

(71) Applicant: Microsoft Technology Licensing, LLC, Redmond, WA (US)

(72) Inventors: Ioannis Manousakis, Redmond, WA (US); Alok Gautam Kumbhare, Redmond, WA (US); Ricardo Gouvêa Bianchini, Bellevue, WA (US); Brijesh Warrier, Bellevue, WA (US); Marcus Felipe Fontoura, Medina, WA (US); Kyle Edward Woolcock, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 255 days.

(21) Appl. No.: 16/848,713

(22) Filed: Apr. 14, 2020

(65) Prior Publication Data
US 2021/0318745 A1   Oct. 14, 2021

(51) Int. Cl.
*G06F 1/3296* (2019.01)
*G06F 1/3287* (2019.01)
*G06F 9/455* (2018.01)

(52) U.S. Cl.
CPC .......... *G06F 1/3296* (2013.01); *G06F 1/3287* (2013.01); *G06F 9/45558* (2013.01); *G06F 2009/45575* (2013.01)

(58) Field of Classification Search
None
See application file for complete search history.

(56) References Cited

U.S. PATENT DOCUMENTS

| | | | |
|---|---|---|---|
| 6,487,241 B1 * | 11/2002 | Cole | H04L 5/1438 375/220 |
| 8,862,922 B2 * | 10/2014 | Akers | G06F 11/1417 713/324 |
| 9,292,320 B2 * | 3/2016 | Uyeda | G06F 9/5044 |
| 2008/0301473 A1 | 12/2008 | Perez et al. | |

(Continued)

FOREIGN PATENT DOCUMENTS

WO    2019213466 A1    11/2019

OTHER PUBLICATIONS

"International Search Report and Written Opinion Issued in PCT Application No. PCT/US2021/020767", dated Jun. 7, 2021, 13 Pages.

*Primary Examiner* — Paul Yen
(74) *Attorney, Agent, or Firm* — Ray Quinney & Nebeker P.C; James Bullough

(57) ABSTRACT

The present disclosure relates to systems, methods, and computer readable media for enabling server devices to utilize a higher percentage of power resources while maintaining sufficient availability of power resources of a datacenter or other collection of server devices. For example, systems disclosed herein determine and implement power shaving actions based on virtual machine metadata and in accordance with a power shaving policy to facilitate a significantly higher utilization of power resources on a datacenter during normal operation as well as within periods of limited power capacity on various server devices. Systems described herein provide more efficient utilization of power resources while maintaining service availability guarantees for a variety of virtual machines hosted by servers of the datacenter.

20 Claims, 7 Drawing Sheets

(56) References Cited

U.S. PATENT DOCUMENTS

| | | | |
|---|---|---|---|
| 2010/0222935 A1* | 9/2010 | Forbes, Jr. | G05B 13/02 |
| | | | 700/291 |
| 2012/0134085 A1* | 5/2012 | Gau | H05K 7/1498 |
| | | | 361/679.02 |
| 2014/0059319 A1* | 2/2014 | Noro | G06F 9/5016 |
| | | | 711/171 |
| 2014/0173113 A1* | 6/2014 | Vemuri | H04L 67/1097 |
| | | | 709/226 |
| 2014/0245050 A1 | 8/2014 | Tsirkin et al. | |
| 2016/0103711 A1 | 4/2016 | Gaurav et al. | |
| 2018/0046489 A1* | 2/2018 | Onoue | G06F 9/5083 |
| 2018/0101215 A1 | 4/2018 | Mahindru et al. | |
| 2018/0101220 A1 | 4/2018 | Mahindru et al. | |
| 2020/0034171 A1 | 1/2020 | Kommula et al. | |

* cited by examiner

MANAGING POWER RESOURCES FOR POOLS OF VIRTUAL MACHINES

BACKGROUND

A cloud computing system refers to a collection of computing devices on which data can be remotely stored and accessed. For example, modern cloud computing infrastructures often include a collection of physical server devices organized in a hierarchical structure including computing zones, clusters, virtual local area networks (VLANs), racks, fault domains, etc. Cloud computing systems often make use of different types of virtual services (e.g., computing containers, virtual machines) that provide remote storage and computing functionality to various clients and customers. These virtual services can be hosted by respective server nodes on a cloud computing system.

As demand for cloud computing resources continues to grow, costs associated with providing cloud computing resources has also increased. For example, as additional servers and datacenters are needed to keep up with customer demands, it is estimated that installing additional devices and datacenters will cost billions of dollars over the next several years. In addition to general costs of installing additional devices and datacenters, costs associated with providing power to devices of cloud computing infrastructure will continue to rise.

Many server devices, server racks, and data centers fail to make use of existing power resources in an efficient way. For example, in an effort to prevent server devices from going down or failing to provide adequate availability of cloud-based services, many server devices operate at significantly below full power capacity. Indeed, many server devices operate at or below 60% capacity in an effort to maintain an adequate reserve of power capacity in preparation for servers going down, server maintenance, or other events that may cause server devices to have a limited power capacity for some duration of time. As a result, server devices often fail to provide efficient or cost-effective usage of power resources.

These and other problems exist with regard to managing availability of power resources of cloud computing systems.

DETAILED DESCRIPTION

Figure 1:
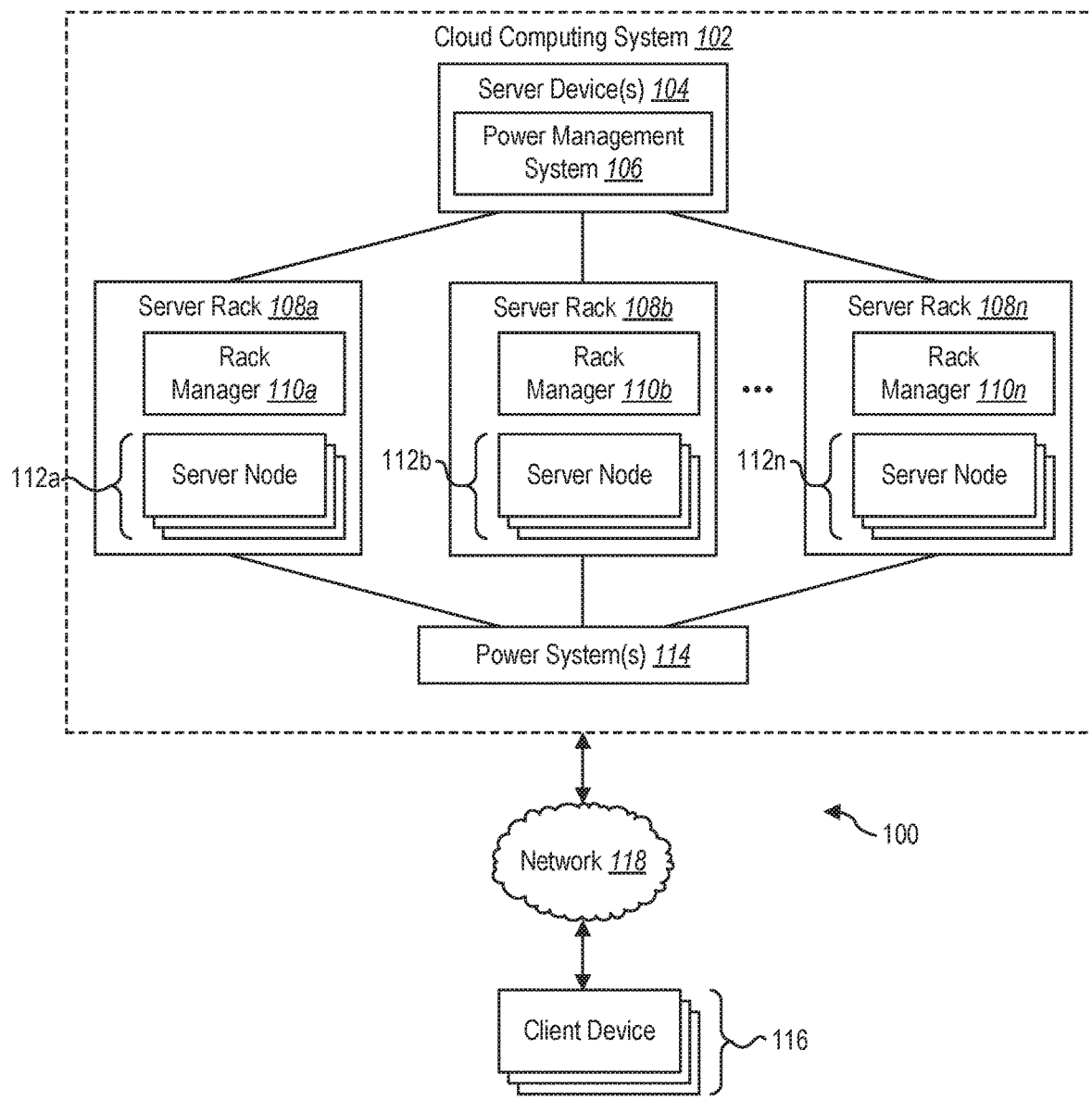
FIG. 1 illustrates an example environment of a cloud computing system including a power management system in accordance with one or more implementations.

The present disclosure is generally related to a power management system for enabling server devices to utilize a higher percentage of power resources under normal operating conditions while ensuring that sufficient power resources are available for limited power events. In particular, and as will be discussed in further detail herein, features and functionality of a power management system may facilitate a significantly higher utilization of power resources on a datacenter during normal operation as well as within periods of limited power capacity (e.g., planned server maintenance) on various server devices. In addition, the power management system can provide more efficient utilization of power resources while maintaining guarantees (e.g., service level agreements (SLAs)) for a variety of virtual machines hosted by a cloud computing system.

For example, in one or more embodiments, the power management system receives metadata (e.g., priority information) for a plurality of virtual machines that are deployable on a cloud computing system. The power management system may identify an upcoming limited power event associated with limited power capacity for one or more server racks on the cloud computing system. The power management system can additionally determine one or more power shaving actions (e.g., power shedding, power capping) to perform on the server rack(s) based on the received metadata and in accordance with a power shaving policy. Further, the power management system can implement one or more power shaving actions on the server rack(s).

As will be discussed in further detail below, the present disclosure includes a number of practical applications having features described herein that provide benefits and/or solve problems associated with increasing utilization of power resources while maintaining guarantees of performance for virtual machines on a collection of server devices (e.g., a server rack, a datacenter). Some example benefits are discussed herein in connection with various features and functionality provided by the power management system. Nevertheless, it will be appreciated that benefits explicitly discussed in connection with one or more implementations are provided by way of example and are not intended to be a comprehensive list of all possible benefits of the power management system.

For example, by accurately identifying an upcoming window or duration of time associated with limited power capacity, the power management system can maintain a higher level of power utilization prior to and after the window of limited power capacity. This ensures an overall higher usage of power resources, which can significantly lower the cost of providing additional server resources to a growing base of customers. Indeed, by increasing power capacity from 60% to 75%, the power management system can increase a standard 7.2 megawatt (MW) capacity to 8.2 MW capacity for a datacenter colocation center. Even further, one or more implementations of the power management system described herein can boost power utilization from 7.2 MW capacity (e.g., a given datacenter or colocation center operating at 60% capacity) to 9.6 MW capacity (e.g., a given datacenter or colocation center operating at >90% capacity) for a given collaboration center (or simply "a datacenter colo").

In addition to generally increasing power capacity of datacenters or other groupings of server devices, the power management system can utilize virtual machine metadata to pool virtual machines in a way that enables the virtual machines to provide services in accordance with SLAs and other performance guarantees. For example, and as will be discussed in further detail below, the power management system can pool virtual machines into groups based on different levels of service guarantees (e.g., a guaranteed percentage of availability over time) in a way that enables the power management system to prioritize performance of virtual machines without causing one or more virtual machines hosted by server devices from breaching SLAs.

In addition to pooling virtual machines, the power management system can additionally perform various power shaving actions in accordance with the virtual machine metadata in preparation for and/or during a limited power event. As will be discussed in further detail below, the power management system can selectively implement power shaving actions, such as power shedding (e.g., different types of power shedding) and power capping on one or more server racks in order to prevent power utilization on the server rack(s) from exceeding a power threshold level during the limited power event. As mentioned above, and as will be discussed further, the power management system can perform or otherwise implement the various power shaving actions without violating service guarantees of the virtual machines.

As illustrated in the foregoing discussion, the present disclosure utilizes a variety of terms to described features and advantages of the systems described herein. Additional detail is now provided regarding the meaning of some of these terms. For example, as used herein, a "cloud computing system" refers to a network of connected computing devices that provide various services to computing devices (e.g., customer devices). For instance, as mentioned above, a distributed computing system can include a collection of physical server devices (e.g., server nodes) organized in a hierarchical structure including clusters, computing zones, virtual local area networks (VLANs), racks, fault domains, etc.

In one or more embodiments described herein, a cloud computing system may include a set of server nodes or plurality of devices that share an electrical infrastructure. For example, in one or more embodiments described herein, a plurality of server devices may refer to server racks of one or more datacenters (e.g., a colocation center or region of datacenters). In one or more examples described herein, a set of server racks refers to a colocation center (or a "datacenter colo") having a distributed redundant electrical infrastructure capable of achieving five nines availability (e.g., guaranteed availability for 99.999% over a defined period of time) for virtual machines hosted thereon. A datacenter colo may be equipped with reserve uninterruptible power supply (UPS) and generator capacity to tolerate up to a single UPS or generator downtime as a result of unplanned events, planned maintenance, or other limited power event(s).

As used herein, a "virtual machine" refers to an emulation of a computer system on a server node that provides functionality of one or more applications on the cloud computing system. Virtual machines can provide functionality needed to execute one or more operating systems. In addition, virtual machines can make use of hypervisors on processors of server devices that support virtual replication of hardware. It will be understood that while one or more specific examples and implementations described herein relate specifically to virtual machines, features and functionality described in connection with pooling virtual machines may similarly apply to any cloud-based service hosted on server nodes of a cloud computing system.

As used herein, a "limited power event" refers to any event in which power capacity for one or more server nodes is limited for a duration of time. For example, a limited power event may refer to a window of time in which maintenance is scheduled or predicted to occur on a given server node, server rack, or multiple server racks of a datacenter. In one or more implementations described herein, a limited power event refers to a period of time in which power utilization for a server node or group of server nodes cannot exceed a threshold utilization level (e.g., 60% power utilization) as a result of other processes being performed by server device(s) and/or without causing damage to hardware of the cloud computing system.

As used herein, a "power shaving action" refers to any action implemented on a server node in connection with reducing power usage of the server node for a duration of time. For instance, a power shaving action may refer to power capping in which power consumption of a server node (or multiple server nodes) is reduced without shutting down the server node or discontinuing operation of virtual machines thereon. As another example, a power shaving action may refer to power shedding in which one or more servers or server racks are killed (e.g., shut down). As will be discussed in further detail below, a power management system can implement various power shaving actions in accordance with a power shaving policy and based on metadata of virtual machines hosted on server nodes of the cloud computing system.

Additional detail will now be provided regarding a power management system in relation to illustrative figures portraying example implementations. For example, FIG. 1 illustrates an example environment 100 including a cloud computing system 102. The cloud computing system 102 may include any number of devices. For example, as shown in FIG. 1, the cloud computing system includes one or more server device(s) 104 having a power management system 106 implemented thereon. As will be discussed in further detail below, the power management system 106 can collect information associated with power usage, a topology of devices on the cloud computing system 102, and virtual machine metadata to perform features and functionality associated with managing utilization of power resources in accordance with one or more embodiments described herein.

As shown in FIG. 1, the cloud computing system 102 further includes any number of server racks 108a-n. The server racks 108a-n may refer to a collection of server racks of a datacenter, a region of datacenters, or one or more datacenter colos. As shown in FIG. 1, the server racks 108a-n may include rack managers 110a-n and a set of server nodes 112a-n. For example, a first server rack 108a may include a first rack manager 110a and server nodes 112a. the rack manager 110a may manage operation of the server nodes 112a. In particular, the rack manager 110a can make local decisions regarding deployment of virtual machines and other services as well as implementing various power shaving commands on the server nodes 112a of the server rack 108a. Each of the additional server racks 108b-n may include rack managers 110b-n and server nodes 112b-n having similar features and functionality as corresponding components on the first server rack 108a.

As further shown, the cloud computing system 102 incudes one or more power system(s) 114 for providing power resources to the server racks 108a-n. The power system(s) 114 can include a variety of power-related devices that provide power-related services to the server racks 108a-n.

For example, the power system(s) 114 may include one or more power distribution units (PDUs) including outlets that provide a power supply to server nodes 112*a-n* of the server racks 108*a-n*. The power system(s) 114 may additionally include other power related components such as electrical distribution hardware and other devices that contribute to the power capacity and power consumption of the server racks 108*a-n*.

As further shown in FIG. 1, the environment 100 includes client devices 116 in communication with the cloud computing system 102. The client devices 116 may refer to various types of client devices capable of accessing data and various services on the cloud computing system 102. For instance, a client device may refer to a mobile device such as a mobile telephone, a smart phone, a personal digital assistant (PDA), a tablet, a laptop, or wearable computing device (e.g., a headset or smartwatch). A client device may also refer to a non-mobile device such as a desktop computer, a server node (e.g., from another cloud computing system), or other non-portable device. The client devices 116, server device(s) 104, and server nodes 112*a-n* may include additional features and functionality as generally discussed below in connection with FIG. 7.

The network 118 may include one or multiple networks that use one or more communication platforms or technologies for transmitting data. For example, the network 118 may include the Internet or other data link that enables transport of electronic data between respective client devices 116 and components (e.g., server device(s) 104 and/or server nodes hosting virtual machines thereon) of the cloud computing system 102.

Figure 2:
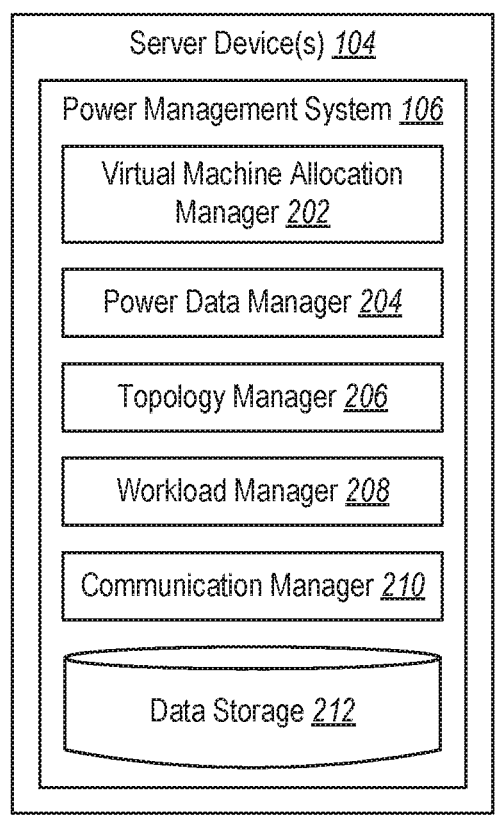
FIG. 2 illustrates an example implementation of the power management system in accordance with one or more implementations.

Additional detail will now be discussed in connection with the power management system 106 in accordance with one or more embodiments herein. For example, as shown in FIG. 2, the power management system 106 can include a virtual machine allocation manager 202, a power data manager 204, a topology manager 206, a workload manager 208, and a communication manager 210. As further shown, the power management system 106 may include a data storage 212 including information such as a power shaving policy, model(s) for predicting server maintenance, historical power usage data, device topology data, and any other information that the power management system 106 utilizes in performing features and functionality described herein.

As mentioned above, the power management system 106 may include a virtual machine allocation manager 202. In one or more embodiments, the virtual machine allocation manager 202 assigns virtual machines to different virtual machine pools. The virtual machine allocation manager 202 can group the virtual machines in pools prior to or after deployment of the virtual machines on the server racks. In addition, the virtual machine allocation manager 202 can group the virtual machines in virtual machine pools in a variety of ways and based on different metrics of priority.

For example, the virtual machine allocation manager 202 can group virtual machines based on priority of owners or clients associated with the virtual machines. For instance, where a virtual machine is owned or otherwise associated with a high priority customer, the virtual machine allocation manager 202 can group the virtual machine into a higher priority pool than a virtual machine that belongs to a low priority customer.

As another example, the virtual machine allocation manager 202 can group virtual machines based on an impact priority. In particular, the virtual machine allocation manager 202 can group virtual machines based on an impact (e.g., a customer impact) of performing one or more power shaving actions on the virtual machine. For instance, where the virtual machine cannot go down or significantly slow down operation without potentially violating a guarantee of service availability, the virtual machine allocation manager 202 can place the virtual machine into a high priority group. Alternatively, where the virtual machine can tolerate a server slowdown or even go offline for an extended period of time (e.g., where other virtual machines or storage volumes provide sufficient redundancy), the virtual machine allocation manager 202 may place the virtual machine in a low priority group.

In addition to generally grouping the virtual machines based on relative priority to one another, the virtual machine allocation manager 202 can additionally group the virtual machines based on power shaving actions that can be performed with respect to the virtual machines. For example, where some virtual machines may be equipped to tolerate power capping, those same virtual machines may not be equipped to tolerate power shedding. In one or more embodiments, the virtual machine allocation manager 202 can group the virtual machines in different pools in accordance with power shaving actions that can be performed on server nodes hosting the respective virtual machines. Additional information in connection with pooling virtual machines is discussed below in connection with FIG. 3.

As mentioned above, and as shown in FIG. 2, the power management system 106 includes a power data manager 204. The power data manger 204 can collect power-related data (e.g., real-time power consumption data) from one or more power system(s) 114. For example, the power data manger 204 can collect and compile power utilization data from different systems such as PDUs and electrical distribution components. The power utilization data may include information about utilization power over time as well as utilization power by specific devices (e.g., server racks 108*a-n*) of the cloud computing system 102. As will be discussed below, the power data manger 204 can compile power utilization data over time to generate historical data reflective of the power utilization over time.

The power management system 106 may further include a topology manager 206. The topology manager 206 may collect or otherwise maintain information associated with topology of the cloud computing system 102. In particular, the topology manager 206 can maintain information including a hierarchy of server devices (e.g., server racks, server nodes, PDUs, electrical distribution components, etc.). The topology manager 206 can maintain information about what servers are connected, which switches, routers, or other devices on the server racks are in communication with other devices of the cloud computing system 102, what transformers feed to which server devices, etc. In one or more embodiments, the topology manager 206 maintains a server inventory including any information indicating a power or device hierarchy. The topology manager 206 may update the topology information over time (e.g., as new devices are connected or as other devices are disconnected, removed, or replaced).

The power management system 106 may further include a workload manager 208. The workload manager 208 can implement one or more power shaving policies to determine power shaving action(s) to perform with respect to virtual machines and/or server devices of the cloud computing system 102. For example, the workload manager 208 can determine one or more of a power capping action or power shedding action to perform based on virtual machine metadata, a current or historical state of power utilization information, and rules from a power shaving policy that determines which action to perform on which servers of the cloud computing system 102. Further information in connection with various examples will be discussed below in connection with FIGS. 4-5B.

The power management system 106 may further include a communication manager 210. After determining one or more power shaving actions to perform in preparation or in response to a limited power event, the communication manager 210 can communicate one or more power shaving actions to implement on one or more server devices. For example, the communication manager 210 can communicate one or more power shaving commands to one or more rack managers to enable the rack managers to locally implement power shaving actions on server nodes. In addition, or as an alternative, the communication manager 210 can communicate one or more power shaving commands directly to server nodes on a server rack to implement power shaving actions on the respective server node(s) (e.g., without communicating the power shaving command(s) to the rack manager(s)).

As further shown, the power management system 106 includes a data storage 212, which may include any information that enables the power management system 106 to perform features and functionalities described herein. For example, the data storage 212 may include virtual machine metadata collected and maintained by the virtual machine allocation manager 202. The data storage 212 may additionally include power utilization data collected and maintained by the power data manager 204. The data storage 212 may also include topology data including any information about the devices and connectivity between devices of the cloud computing system 102. The data storage 212 can include data for the power shaving policy including rules for how virtual machines are allocated and/or rules for what power shaving actions should be performed based on various factors described herein. As shown in FIG. 2, the data storage 212 can include information stored on the server device(s) 104. Alternatively, the data storage 212 can include data stored across multiple devices and accessible by components 202-210 of the power management system 106.

Each of the components 202-212 of the power management system 106 may be in communication with each other using any suitable communication technologies. In addition, while the components 202-212 of the power management system 106 are shown to be separate in FIG. 2, any of the components or subcomponents may be combined into fewer components, such as into a single components, or divided into more components as may serve a particular implementation. As an illustrative example, the virtual machine allocation manager 202 may be implemented on a different server than additional components 204-210. In addition, one or more components related to collecting data (e.g. the power data manager 204 and the topology manager 206 may be implemented on a different server than other components related to determining and implementing power shaving actions (e.g., the workload manager 208 and communication manager 210).

The components 202-212 of the power management system 106 may include hardware, software, or both. For example, the components 202-212 of the power management system 106 shown in FIG. 2 may include one or more instructions stored on a computer-readable storage medium and executable by processors of one or more computing devices. When executed by the one or more processors, the computer-executable instructions of one or more computing devices (e.g., server device(s) 104) can perform one or more methods described herein. Alternatively, the components 202-212 of the power management system 106 can include hardware, such as a special purpose processing device to perform a certain function or group of functions. Additionally, or alternatively, the components 202-212 of the power management system 106 can include a combination of computer-executable instructions and hardware.

Figure 3:
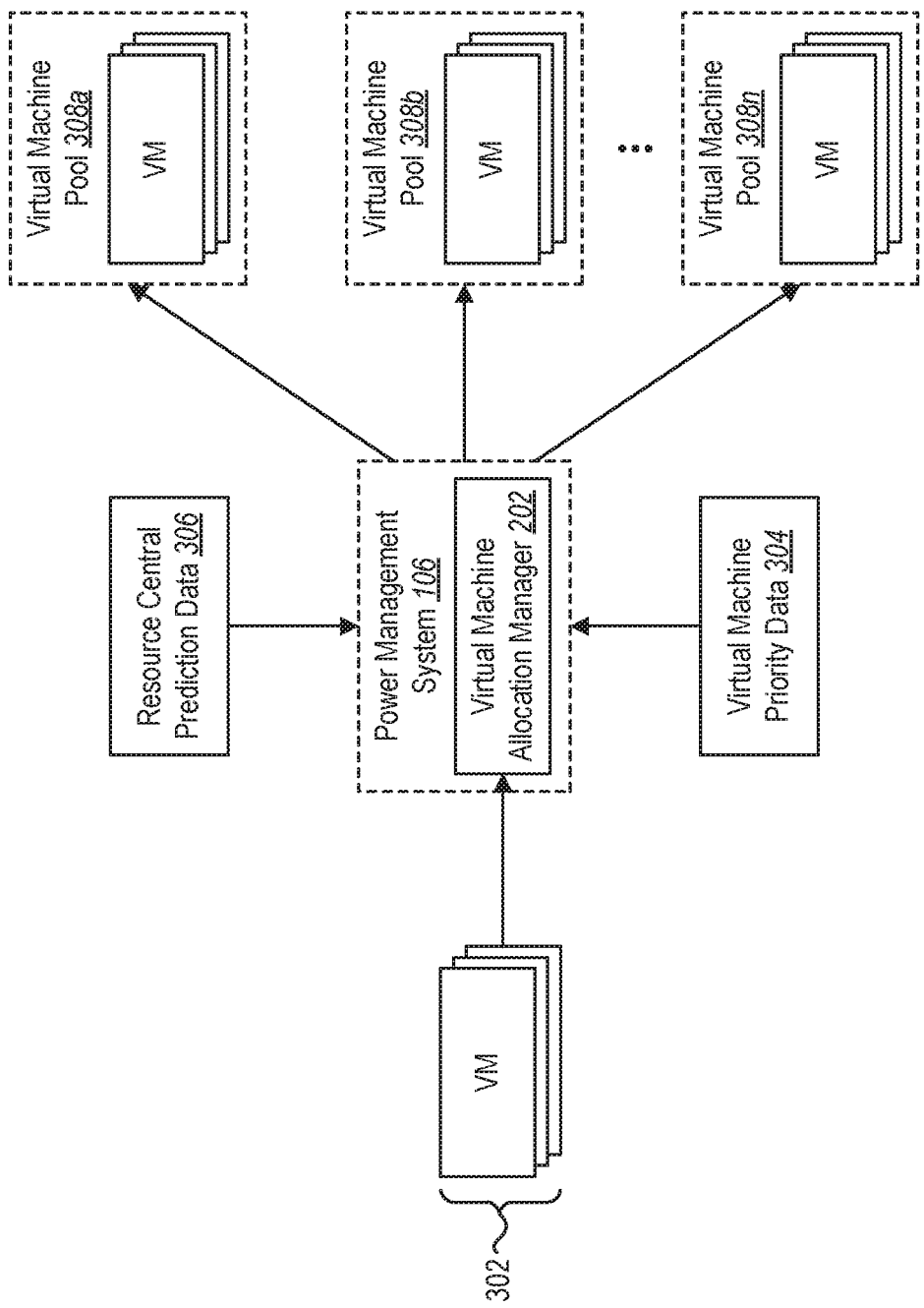
FIG. 3 illustrates an example implementation of grouping virtual machines into virtual machine pools in accordance with one or more implementations.

FIG. 3 illustrates an example implementation of the virtual machine allocation manager 202 in accordance with one or more implementations. In particular, FIG. 3 illustrates an example workflow 300 in which the allocation manager 202 (or other component of the power management system 106) groups virtual machines into a plurality of virtual machine pools. As will be discussed in further detail below, the virtual machine pools may be used in determining appropriate power shaving actions to perform on devices of the cloud computing system 102.

As shown in FIG. 3, the allocation manager 202 can receive information associated with deployment of a plurality of virtual machines 302. For example, the allocation manager 202 can evaluate a plurality of virtual machines 302 previously deployed on the cloud computing system 102. In addition, or as an alternative, the allocation manager 202 can receive information about virtual machines 302 prior to deployment of the virtual machines on the cloud computing system 102. In one or more embodiments, the receives incoming virtual machines and groups the virtual machine(s) as they are already deployed.

As shown in FIG. 3, the allocation manager 202 may additionally receive virtual machine priority data 304. The virtual machine priority data 304 may include any metadata associated with the incoming virtual machines 302. For example, the virtual machine priority data 304 may include an indication of priority for the virtual machine(s) based on an owner or customer associated with the virtual machine(s). For instance, where a customer is a high priority customer of the cloud computing system 102, the virtual machine priority data 304 may include an indication of the high priority status of the customer to be associated with the virtual machine(s). The virtual machine priority data 304 may include any number of levels of priority associated with customers of the respective virtual machines.

The virtual machine priority data 304 can additionally include metadata associated with an impact of performing one or more power shaving actions to server(s) hosting a virtual machine. For example, the virtual machine priority data 304 can indicate a high priority where a virtual machine is unable to tolerate power capping and/or power shedding without interrupting operation of the virtual machine or causing a significant impact to a customer. As another example, the virtual machine priority data 304 can indicate a low priority where a virtual machine is able to tolerate power capping and/or power shedding without posing a significant impact to a customer or client.

The virtual machine priority data 304 may further indicate various levels of impact priority based on different levels of tolerance to various power shaving actions. For example, where a customer will not be negatively impacted as a result of power capping, but where the customer will be significantly impacted as a result of power shedding, the virtual machine priority data 304 can indicate some intermediate level of impact priority.

In addition to impact-related metrics, the virtual machine priority data 304 can additionally include metadata associated with different thresholds of service availability and/or performance guarantees (e.g., service level agreements) associated with corresponding virtual machines and/or customers. For example, where a first virtual machine has an SLA that guarantees five nines availability (e.g., a guarantee of 99.999% service availability over a predetermined period of time) and a second virtual machine has an SLA that guarantees three nines availability (e.g., a guarantee of 99.9% service availability over a predetermined period of time), the virtual machine priority data 304 may group the first virtual machine in a virtual machine pool having higher priority than a virtual machine pool that includes the second virtual machine. As an alternative to SLA specifications, the virtual machine priority data 304 may include any data associated with a service availability for one or more virtual machines. Indeed, the virtual machine priority data 304 can indicate any of a number of different priorities based on metrics of service level availability.

In addition to the virtual machine priority data 304, the allocation manager 202 can additionally receive resource central prediction data 306. The resource central prediction data 306 may indicate any information associated with one or more upcoming limited power events. For example, the resource central prediction data 306 may include information associated with a frequency of limited power events that occur on one or more server racks. In addition, the resource central prediction data 306 may include information associated with a duration of one or more limited power events expected to occur on the server rack(s).

As mentioned above, the resource central prediction data 306 can include any information for an upcoming or ongoing limited power event. For example, the resource central prediction data 306 can include information about a scheduled maintenance (or other limited power event) for a specific time and/or scheduled duration of time. In addition, or as an alternatively, the resource central prediction data 306 can include information about a predicted maintenance (or other limited power event) based on historical power utilization data collected and maintained by the power management system 106.

In one or more embodiments, the power management system 106 and/or resource central system applies a prediction model (e.g., a prediction algorithm or machine learning model) to the collected power utilization data to predict upcoming limited power events. In one or more embodiments, the power management system 106 applies the prediction model to determine a predicted frequency and duration of power outage events. While this model may be located and implemented on a central resource system, the model may similarly be implemented on the power management system 106.

In one or more embodiments, the power management system 106 may utilize the resource central prediction data 306 (in combination with the virtual machine priority data 304) to determine virtual machine pools for the incoming virtual machines 302. In particular, the power management system 106 can determine a measure of priority for the virtual machines 302 and group the virtual machines into a number of virtual machine pools 308a-n associated with different levels of priority. For example, the power management system 106 can group a first subset of the virtual machines 302 into a first virtual machine pool 308a, a second subset of the virtual machines 302 into a second virtual machine pool 308b, and additional subsets of the virtual machines 302 into additional virtual machine pools up to an nth virtual machine pool 308n.

Each of the virtual machine pools 308a-n may be associated with a different measure of priority. For example, a first virtual machine pool 308a may include virtual machines having a highest priority, a second virtual machine pool 308b having a lower priority, and any number of additional virtual machine pools having various levels of priority up to an nth virtual machine pool 308n. In addition, or as an alternative to simply grouping the virtual machine pools based on incremental levels of priority, the power management system 106 can group the virtual machine pools 308a-n based on types of tolerance for various types of power shaving actions and/or based on different service level guarantees.

In one illustrative example, a first virtual machine pool may include virtual machines that are associated with high priority customers and which have SLAs corresponding with a high threshold of service availability (e.g., a service guarantee of or above five nines availability). As another example, a second virtual machine pool may include virtual machines associated with low priority customers and which have lower levels of service availability than the first virtual machine pool (e.g., a service guarantee of three-nines availability or no guaranteed level of service availability).

In one or more embodiments, the power management system 106 groups the virtual machines into respective virtual machine pools based on a comparison of service availability for the virtual machines (e.g., a predetermined service availability or an availability based on a corresponding server node) and any number of service availability thresholds. For example, service availability thresholds may be used to define specific groupings of virtual machines having service availabilities that corresponding to different ranges of service availability metrics.

In one or more embodiments, the power management system 106 simply groups the virtual machines into the virtual machine pools 308a-n in considering one or more power shaving actions to perform in response to upcoming limited power events. This may involve grouping the virtual machines into the respective virtual machine pools 308a-n without modifying deployment or causing any of the virtual machines to migrate between server nodes.

In addition, or as an alternative, the power management system 106 can selectively deploy the virtual machines 302 based on the corresponding virtual machine pools 308a-n. For example, the power management system 106 may deploy virtual machines assigned to a high priority virtual machine pool to a server rack having a high number of empty nodes to ensure adequate server resources independent of upcoming limited power events. In addition, the power management system 106 can deploy virtual machines assigned to a high priority virtual machine pool to specific server nodes that the resource central prediction data 306 indicates are associated with a low frequency and/or low duration of limited power events. In this way, the power management system 106 can deploy high priority virtual machines to those server racks that are expected to experience a low volume and/or low frequency of limited power events over time.

As a further example, the power management system 106 may deploy virtual machines assigned to a lower priority virtual machine pool to server racks that may already have other virtual machines deployed thereon. Moreover, the power management system 106 may deploy lower priority virtual machines to server nodes expected to have higher frequency and/or longer durations of limited power events over time. In either case, the power management system 106 may selectively deploy virtual machines in accordance with the assigned virtual machine pools to avoid causing virtual machines to violate SLAs as a result of scheduled maintenance on the server nodes or other limited power events.

In addition to assigning virtual machines to respective virtual machine pools and further deploying virtual machines to select server racks/nodes in accordance with the assigned virtual machine pools, the power management system 106 may additionally determine and implement power shaving actions based on the virtual machine metadata (e.g., assigned virtual machine pools) as well as additional information about the cloud computing system 102. Additional detail in connection with determining and implementing various power shaving actions is discussed below in connection with FIG. 4.

Figure 4:
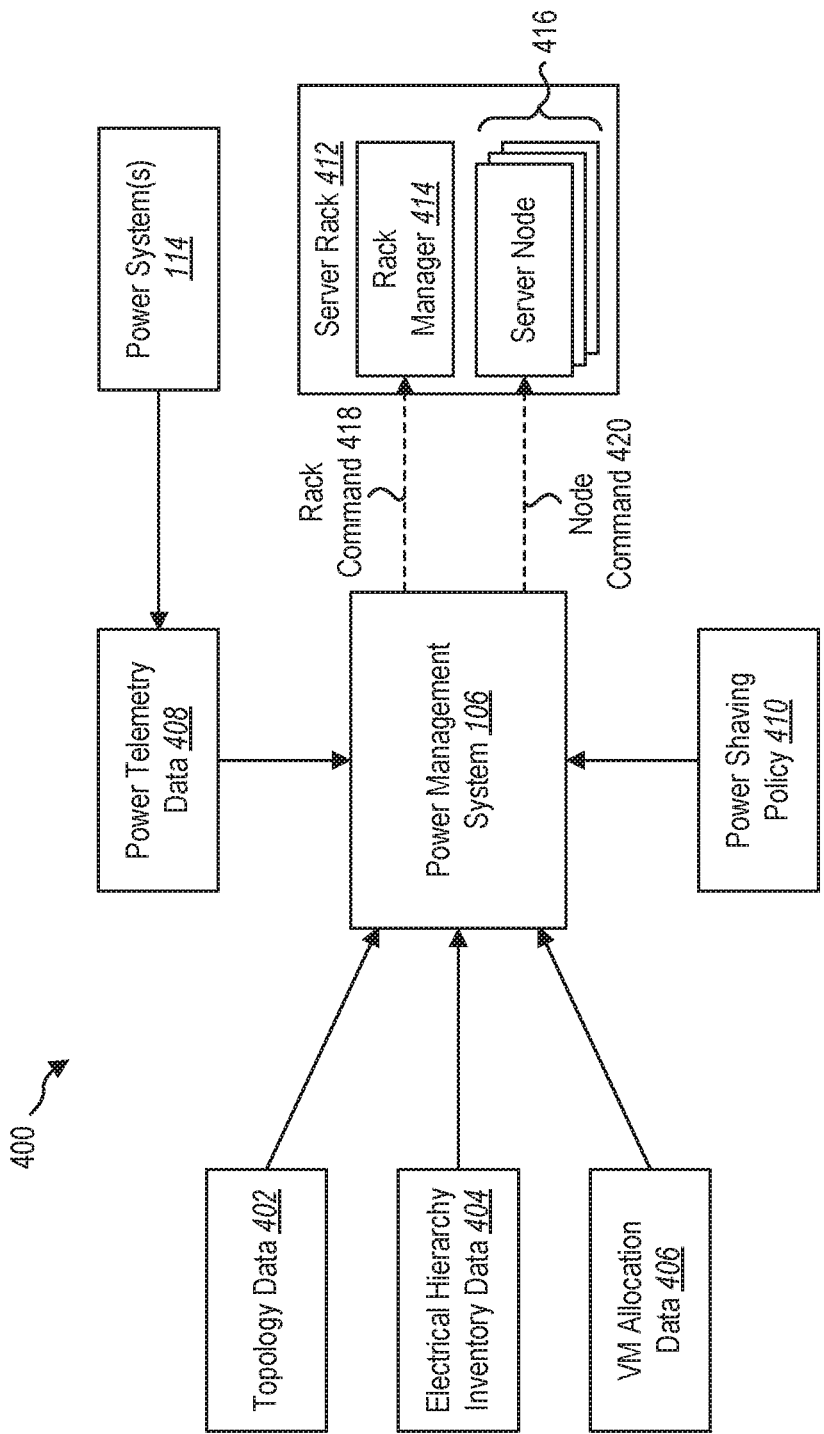
FIG. 4 illustrates an example implementation of managing power consumption on a server rack in accordance with one or more implementations.

For example, FIG. 4 illustrates an example workflow 400 in which the power management system 106 receives data from a number of different sources in order to determine one or more power shaving actions and implement the power shaving action(s) on an example server rack 412. It will be appreciated that while FIG. 4 illustrates a specific example in which power shaving actions are determined and implemented on a server rack 412, the power management system 106 may similarly determine and implement a variety of power shaving actions on any number of server racks in accordance with one or more embodiments described herein.

As shown in FIG. 4, the power management system 106 may receive topology data 402, electrical hierarchy inventory data 404, and virtual machine allocation data 406. In accordance with one or more embodiments described above, the topology data 402 may include any information about devices of the cloud computing system 102 including connection information between devices of the server rack 412 and other devices of the cloud computing system 102. The electrical hierarchy inventory data 404 may include information about the power system(s) 114 including PDUs and electrical distribution components.

The virtual machine allocation data 406 may include any information associated with virtual machines deployed on server nodes 416 of the server rack 412. In one or more embodiments, the virtual machine allocation data 406 includes an identification of each virtual machine deployed on the server rack 412, The virtual machine allocation data 406 may additionally indicate types of virtual machines (e.g., storage or computing machines) on the server rack 412. In one or more embodiments, the virtual machine allocation data 406 includes priority information of the virtual machines including, by way of example, a customer priority (e.g., a priority of a customer who owns the virtual machine), an impact priority (e.g., an impact of performing one or more power shaving actions), or service guarantee information (e.g., a SLA or other server-related guarantee for the virtual machine(s)).

As further shown, the virtual machine allocation data 406 can receive power telemetry data 408 from one or more power system(s) 114 connected to the server rack 412. As shown in FIG. 4, the power telemetry data 408 may be provided via a feedback loop in which PDUs and/or electrical distribution components provide real-time (or near real-time) power utilization data to the power management system 106 for further analysis. As discussed above, the power management system 106 can compile the power telemetry data 408 to generate or otherwise maintain a history of power utilization data associated with historical trends of power consumption by the server rack 412. In one or more embodiments, PDUs and/or electrical distribution components individual provide power utilization data of the respective power system(s) 114 and the power management system 106 compiles the different streams of power utilization data to obtain an accurate representation of power utilization by the server rack 412 over time.

As mentioned above, the power management system 106 can utilize the power telemetry data 408 to determine an upcoming limited power event associated with limited power capacity for the server rack 412 (or for individual server nodes 416 of the server rack 412). In one or more embodiments, the power management system 106 applies a power event prediction model (e.g., a power prediction algorithm or a machine learning model) to predict an upcoming limited power event. Alternatively, in one or more embodiments, the power management system 106 receives an indication of a scheduled or predicted limited power event (e.g., from a central resource server) associated with an upcoming limited power event on the server rack 412.

As shown in FIG. 4, the power management system 106 can additionally receive or otherwise access a power shaving policy 410. The power shaving policy 410 may include rules associated with whether to perform power shaving actions as well as rules for determining which specific power shaving actions to perform (and when). For example, in an effort to reduce power consumption, the power shaving policy 410 may include an indication of power shaving actions such as power shedding and/or power capping that may be performed in order to reduce power consumption in preparation for the limited power event.

In one or more embodiments, the power shaving policy 410 includes rules for determining and implementing specific power shaving actions on server nodes based on priority metrics of virtual machines deployed thereon. For instance, the power shaving policy 410 may include policies for performing specific power shaving actions on the server rack 412 based on whether virtual machines deployed on server nodes 416 of the server rack 412 are grouped within specific virtual machine pools. For example, where virtual machines deployed on a server rack 412 are grouped within a high priority virtual machine pool, the power shaving policy 410 may include rules limiting certain power shaving actions from being implemented on select server nodes 416 of the server rack 412. Alternatively, where virtual machines deployed on the server rack 412 are grouped within a low priority virtual machine pool, the power shaving policy 410 may include less restrictive rules for implementing various power shaving actions than for rules associated with high priority virtual machine pools.

In addition to rules associated with virtual machine pools, the power shaving policy 410 can include rules more specific to different priority metrics associated with the various virtual machines. As a first non-limiting example, where a virtual machine provides a highly redundant stateless service, the power shaving policy 410 may include a rule that power shedding is an appropriate action for a server node hosting the virtual machine based on an impact metric for the virtual machine being very low. Accordingly, where the server nodes 416 of the server rack 412 may host any number of similar types of virtual machines, the power shaving policy 410 may indicate that selectively killing servers or even killing the entire server rack 412 may be an appropriate power shaving action in preparation for a limited power event on the server rack 412 or on a server colo that includes the server rack 412. Because the service is a redundant stateless service, a front-end interface may continue to provide the service to customers by simply routing incoming requests to other virtual machines and/or service nodes capable of providing the stateless service throughout a duration of the limited power event.

As another non-limiting example, where a virtual machine provides a non-critical artificial intelligence (AI) workload that is running a processing service, the power shaving policy 410 may include a rule that power capping is an appropriate action for one or more server nodes hosting the virtual machine (e.g., rather than power shedding or other action that involves killing one or more servers). In accordance with the power shaving policy 410, the power management system 106 may implement power capping by slowing down operation of the server rack 412 (or select server nodes 416 on the server rack 412) allowing the non-critical AI workload to continue while using less processing resources (and consuming less power) in preparation for or during the limited power event.

As another non-limiting example, where a server rack 412 is hosting a critical database incapable of tolerating any points of failure, the power shaving policy 410 may include a rule that no power shaving actions should be performed under any circumstances on select server nodes 416 and/or on the server rack 412. Accordingly, where a limited power event is identified for the server rack 412, the power management system 106 may simply avoid allocating virtual machines to the server rack 412 where allocation of the virtual machines would cause power utilization of the server rack 412 to exceed a minimum threshold that could interfere with server maintenance.

While the above examples provide some rules of the power shaving policy 410 in accordance with one or more embodiments, it will be understood that the power management system 106 may implement any number of power shaving actions to server racks and/or selective server nodes based on virtually any combination of priority metrics associated with virtual machines discussed herein. As will be discussed in further detail below in connection with FIG. 5, the power management system 106 can implement the various power shaving policies in order to prevent power utilization levels of server nodes from exceeding a threshold level of power utilization that may interfere with server maintenance or other limited power event.

In addition to performing power shaving actions, the power management system 106 can additionally perform one or more preventative mitigation actions based on an upcoming limited power event. For example, where power utilization on a server rack 412 is expected to exceed a threshold power utilization that may interfere with operation of the server nodes 416 during an upcoming limited power event, the power management system 106 may take various preventative mitigation actions including, by way of example, migrating planned workloads away from the server rack 412 and/or between server nodes prior to the limited power event.

For example, where a first server rack is expected to experience a power utilization spike during a scheduled maintenance, the power management system 106 can remove upcoming workloads to a second server rack that does not have an upcoming scheduled maintenance at the same time. Along similar lines, the power management system 106 can selectively move workloads from one server node to another server node (e.g., on the same or different server racks) in preparation for an upcoming limited power event.

In one or more embodiments, the power management system 106 implements a combination of preventative mitigation actions and power shaving actions. For example, where an upcoming limited power event refers to a scheduled maintenance and where the server rack 412 is hosting predictable workloads, the power management system 106 can both selectively migrate workloads to other server racks in addition to performing power capping, power shedding, or some combination of power shaving actions during the limited power event. In one or more embodiments, the power management system 106 performs whatever combination of preventative mitigation actions and power shaving actions expected to have a minimal impact (e.g., in accordance with the power shaving policy 410) for a customer.

As shown in FIG. 4, the power management system 106 can implement the power shaving actions (and/or preventative mitigation actions) in a variety of ways. For example, in one or more embodiments, the power management system 106 provides a rack command 418 to the rack manager 414. As used herein, a rack command 418 refers to any power shaving command to be locally implemented on one or more of the server nodes 416 of the server rack 412.

As an alternative to providing the rack command 418 to the rack manager 414, in one or more implementations, the power management system 106 can provide a node command 420 to one or more of the server nodes 416. For example, the power management system 106 may issue a power shaving command directly to one or multiple server nodes 416 on the server rack 412.

Figure 5A:
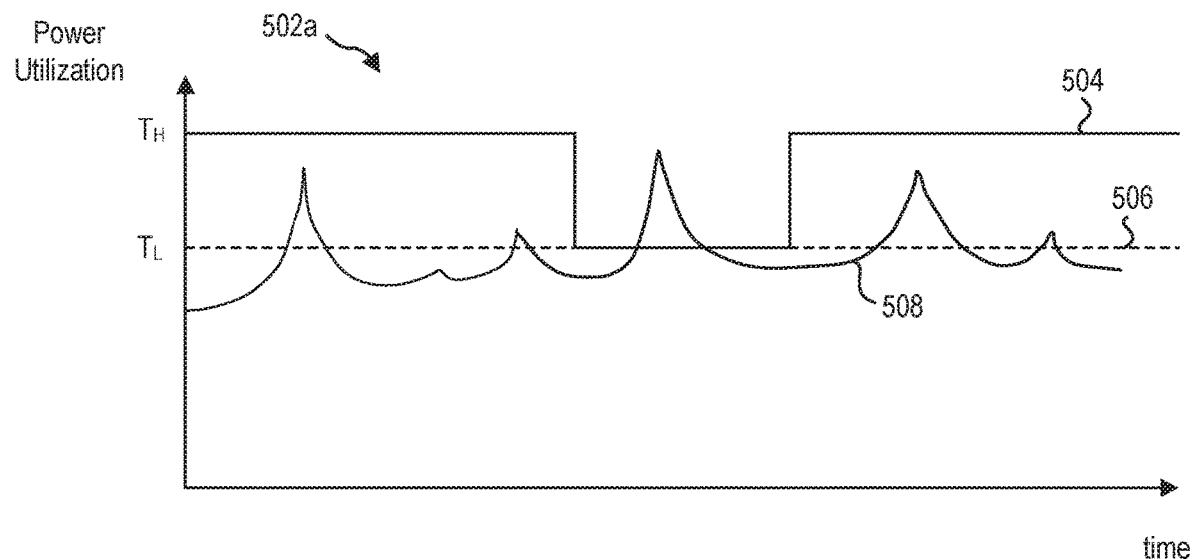
FIGS. 5A-5B illustrate example timelines showing predicted power consumption on a server rack as a result of implementing power shaving actions in accordance with one or more implementations.
Figure 5B:
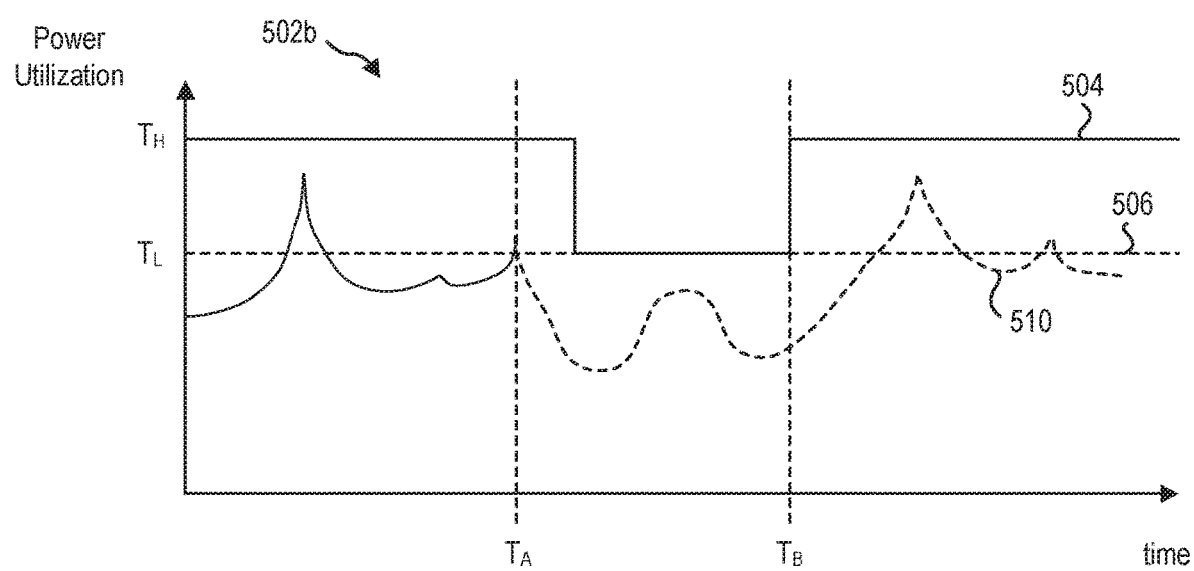

FIGS. 5A-5B illustrate example power utilization graphs 502a-b showing power utilization over time with respect to one or more server nodes. For example, FIG. 5A illustrates an example power utilization graph 502a showing a predicted power utilization over time relative to a low threshold 506 corresponding to a maximum amount of power utilization that may be allocated to virtual machines and other processes of a server node, server rack, server colo, or other set of processing resources while still allowing sufficient power utilization to be allocated for an upcoming planned server maintenance (or other limited power event). FIG. 5A further shows a high threshold 504 corresponding to a maximum amount of power utilization that may be allocated to virtual machines and other processes of the set of processing resources outside of the server maintenance window.

FIG. 5A illustrates a predicted power utilization 508 over time based on a current allocation of virtual machines on a set of processing resources. As shown in FIG. 5A, the predicted power utilization 508 exceeds the low threshold 506 outside of the upcoming maintenance as well as during the upcoming maintenance. As a result, the power management system 106 may perform one or more actions in accordance with one or more embodiments described herein in order to prevent utilization of the low threshold 506 during the upcoming maintenance window.

For instance, FIG. 5B illustrates an example power utilization graph 502b showing an updated predicted power utilization 510 as a result of the power management system 106 determining and implementing one or more power shedding actions in accordance with one or more embodiments. For example, as shown in FIG. 5B, the power management system 106 may begin performing one or more preventative mitigation actions such as offloading predictable workloads from a server rack to one or more additional server racks.

In addition, and as shown in FIG. 5B, the power management system 106 can perform one or more power shaving actions (e.g., power capping) causing what would have been a power utilization peak during the maintenance window to level out and spread out over time without exceeding the low threshold. As further shown in FIG. 5B, the power management system 106 may cease implementing various preventative mitigation and/or power shaving actions and permit power utilization to again exceed the low threshold 506 after the server maintenance has completed.

Figure 6:
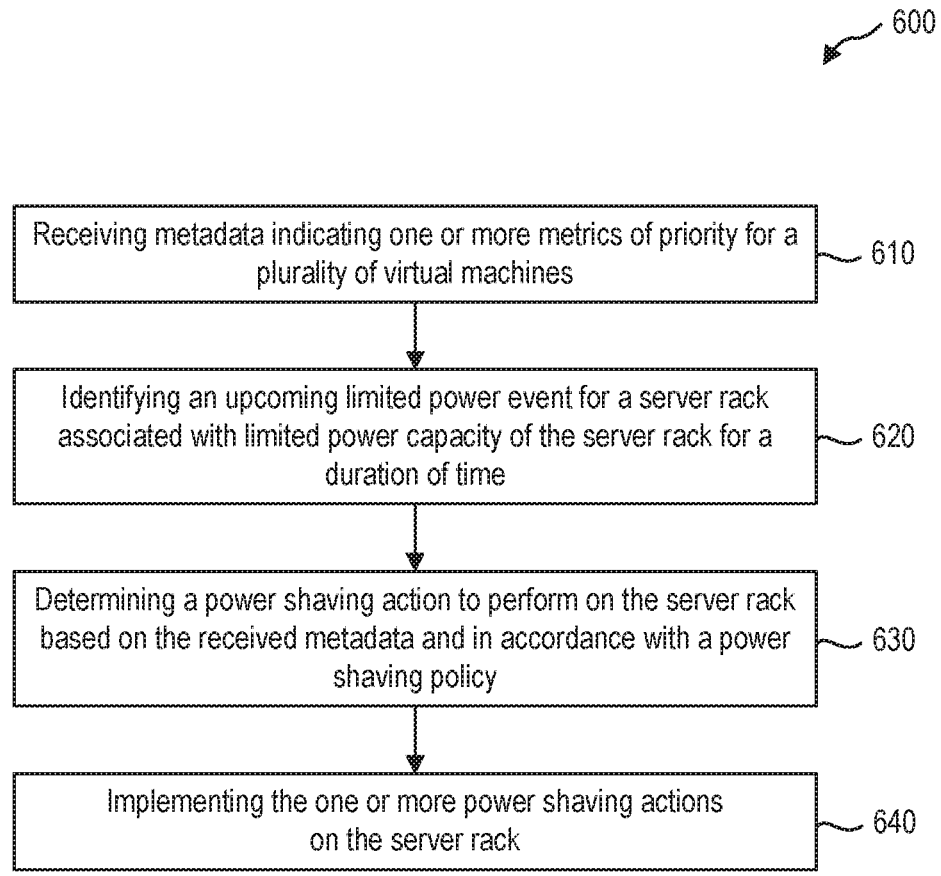
FIG. 6 illustrates an example series of acts for managing power consumption on one or more server racks in accordance with one or more embodiments.

Turning now to FIG. 6, this figure illustrates an example flowchart including a series of acts for determining and implementing various power shaving actions based on virtual machine metadata in accordance with one or more embodiments described herein. While FIG. 6 illustrates acts according to one or more embodiments, alternative embodiments may omit, add to, reorder, and/or modify any of the acts shown in FIG. 6. The acts of FIG. 6 can be performed as part of a method. Alternatively, a non-transitory computer-readable medium can include instructions that, when executed by one or more processors, cause a computing device to perform the acts of FIG. 6. In still further embodiments, a system can perform the acts of FIG. 6.

FIG. 6 shows a series of acts 600 related to determining and implementing various power shaving actions on a server rack in accordance with one or more embodiments. As shown in FIG. 6, the series of acts 600 includes an act 610 of receiving metadata indicating one or more metrics of priority for a plurality of virtual machines. For example, in one or more implementations, the act 620 involves receiving metadata for a plurality of virtual machines, the metadata indicating a metric of priority for the plurality of virtual machines.

In one or more embodiments, the series of acts 600 includes grouping the plurality of virtual machines into virtual machine pools, the virtual machine pools including a first virtual machine pool associated with a first level priority on the cloud computing system and a second virtual machine pool associated with a second level of priority on the cloud computing system. Grouping the plurality of virtual machines into virtual machine pools may include grouping the virtual machine pools based on one or more of a level of priority of one or more owners of the virtual machines and a level of service availability of the virtual machines relative to one or more threshold levels of service availability. In one or more implementations, the series of acts 600 includes selectively deploying one or more virtual machines on server nodes of the one or more server racks based on whether the one or more virtual machines are grouped within the first virtual machine pool or the second virtual machine pool.

As shown in FIG. 6, the series of acts 600 further includes an act 620 of identifying an upcoming limited power event for a server rack associated with limited power capacity of the server rack for a duration of time. For example, in one or more implementations, the act 620 involves identifying an upcoming limited power event associated with limited power capacity of one or more server racks of a cloud computing system for a duration of time. In one or more implementations, identifying the upcoming limited power event includes one or more of predicting the upcoming limited power event based on historical power usage data for the one or more server racks or receiving an indication of a scheduled maintenance on the one or more server racks.

As further shown in FIG. 6, the series of acts 600 includes an act 630 of determining a power shaving action to perform on the server rack based on the received metadata and in accordance with a power shaving policy. For example, in one or more implementations, the act 630 involves determining one or more power shaving actions to perform on the one or more server racks based on the received metadata for the plurality of virtual machines and in accordance with a power shaving policy. The power shaving actions may include one or more of slowing down operation of one or more server nodes on the one or more server racks (e.g., power capping) or selectively shutting down one or more server nodes on the one or more server racks (e.g., power shaving).

As further shown in FIG. 6, the series of acts 600 includes an act 640 of implementing the one or more power shaving actions on the server rack. For example, in one or more implementations, the act 640 involves implementing the one or more power shaving actions on the one or more server racks. In one or more embodiments, implementing the one or more power shaving actions on the one or more server racks includes providing one or more shaving commands to a rack manager of the one or more server racks where providing the one or more shaving commands to the rack manager causes the rack manager to locally implement the one or more power shaving actions on the one or more server racks. In addition, or as an alternative, implementing the one or more power shaving actions on the one or more server racks may include providing one or more power shaving commands directly to one or more server nodes on the one or more server racks.

In one or more embodiments, determining one or more power shaving actions includes determining that a first server node on the one or more server racks is hosting a first virtual machine associated with a first customer account on the cloud computing system associated with a first level of customer priority and determining that a second server node on the one or more server racks is hosting a second virtual machine associated with a second customer account on the cloud computing system associated with a second level of customer priority. In addition, implementing the one or more power shaving actions on the one or more server racks may include performing the one or more power shaving actions on the first server node without performing the one or more power shaving actions on the second server node based on a difference in priority between the first level of customer priority and the second level of customer priority.

In one or more embodiments, determining one or more power shaving actions includes determining that a first server node on the one or more server racks is hosting a first virtual machine associated with a first level of service availability and determining that a second server node on the one or more server racks is hosting a second virtual machine associated with a second level of guaranteed service availability. In addition, implementing the one or more power shaving actions on the one or more server racks may include performing the one or more power shaving actions on the first server node without performing the one or more power shaving actions on the second server node based on the difference between the first level of service availability and the second level of service availability.

Figure 7:
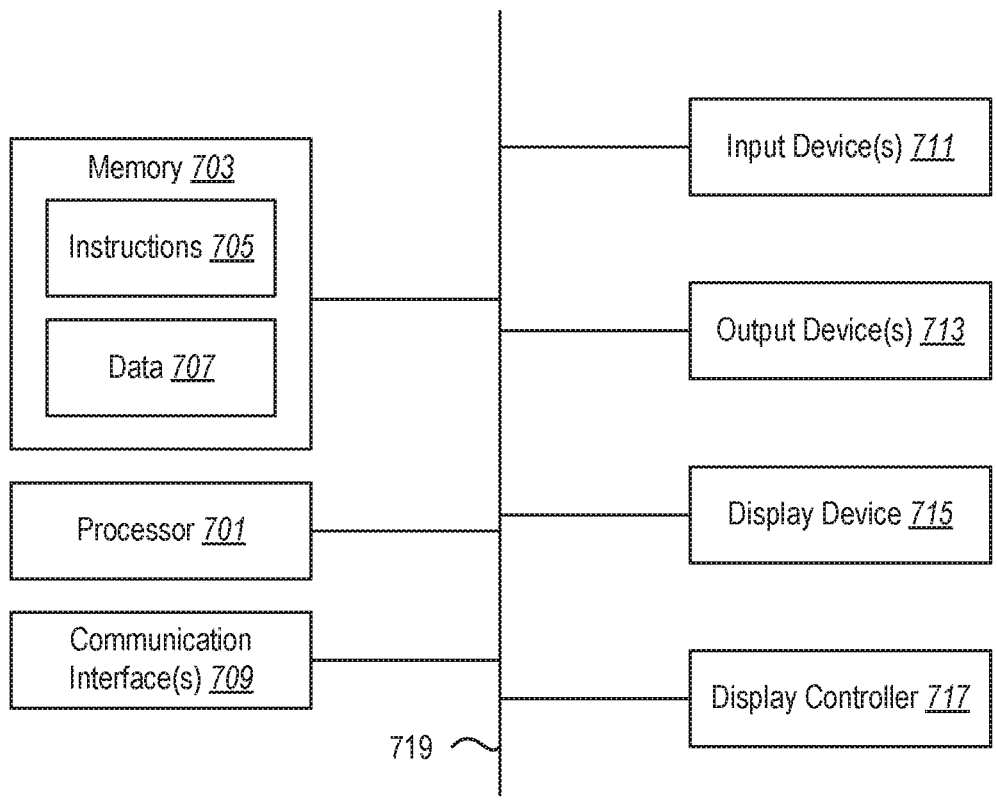
FIG. 7 illustrates certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
    receiving metadata for a plurality of virtual machines, the metadata indicating a metric of priority for the plurality of virtual machines;
    allocating a first set of virtual machines from the plurality of virtual machines to a first priority pool on a first set of server nodes based on a first metric of priority associated with the metadata of the first set of virtual machines, the first set of server nodes being implemented on one or more server racks of a cloud computing system, wherein the first metric of priority is associated with a first level of tolerance for performing one or more power shaving actions on the first set of server nodes having the first set of virtual machine implemented thereon;

allocating a second set of virtual machines from the plurality of virtual machines to a second priority pool on a second set of server nodes based on a second metric of priority associated with the metadata of the second set of virtual machines, the second set of server nodes being implemented on the one or more server racks, wherein the second metric of priority is associated with a second level of tolerance for performing the one or more power shaving actions on the second set of server nodes having the second set of virtual machines implemented thereon;

identifying an upcoming limited power event associated with limited power capacity of the one or more server racks for a duration of time;

determining server nodes of the one or more server racks on which to perform the one or more power shaving actions, wherein determining the server nodes includes identifying the first set of server nodes based on the first level of tolerance associated with the first set of server nodes being higher than the second level of tolerance associated with the second set of server nodes; and implementing the one or more power shaving actions on the first set of server nodes, wherein implementing the one or more power shaving actions on the first set of server nodes causes the one or more server racks to operate within the limited power capacity associated with the upcoming limited power event.

2. The method of claim 1, wherein allocating the first set of virtual machines and the second set of virtual machines into respective priority pools is based on the metadata indicating one or more of:

a level of priority of one or more owners of the plurality of virtual machines; or a level of service availability of the plurality of virtual machines relative to one or more threshold levels of service availability.

3. The method of claim 1, wherein identifying the upcoming limited power event comprises one or more of:

predicting the upcoming limited power event based on historical power usage data for the one or more server racks; or receiving an indication of a scheduled maintenance on the one or more server racks.

4. The method of claim 1, wherein the power shaving actions comprise one or more of:

a power capping action associated with slowing down operation of one or more server nodes on the one or more server racks; or a power shedding action associated with selectively shutting down one or more server nodes on the one or more server racks.

5. The method of claim 1, wherein determining one or more power shaving actions comprises:

determining that the first set of virtual machines is associated with a first level of service availability; and determining that the second set of virtual machine is associated with a second level of service availability, and wherein implementing the one or more power shaving actions on the first set of server nodes comprises performing the one or more power shaving actions on the first set of server nodes without performing the one or more power shaving actions on the second set of server nodes based at least in part on the first level of service availability being lower than the second level of service availability.

6. The method of claim 1, wherein implementing the one or more power shaving actions on the first set of server nodes comprises providing one or more shaving commands to a rack manager of the one or more server racks, wherein providing the one or more shaving commands to the rack manager causes the rack manager to locally implement the one or more power shaving actions on the first set of server nodes.

7. The method of claim 1, wherein implementing the one or more power shaving actions on the first set of one or more server nodes comprises providing one or more power shaving commands directly to server nodes on the first set of one or more server nodes.

8. The method of claim 1, wherein the one or more power shaving actions including power shedding, wherein the first level of tolerance indicates a tolerance for performing power shedding on the first set of server nodes while the second level of tolerance indicates an intolerance for performing power shedding on the second set of server nodes.

9. The method of claim 1, wherein the associated impact of performing the one or more power shaving actions is associated with an ability of a given virtual machine to tolerate performing a first type of power shaving action while not being able to tolerate a second type of power shaving action, and wherein allocating the first set of virtual machines to the first priority pool is based on the first set of virtual machines having an ability to tolerate performing the first type of power shaving action while not being able to tolerate the second type of power shaving action.

10. The method of claim 1, wherein the one or more power shaving actions includes power shedding and power capping, wherein the first level of tolerance indicates a tolerance of performing both power capping and power shedding, wherein the second level of tolerance indicates a tolerance of performing power capping and an intolerance of power shedding.

11. A system, comprising:

one or more processors;

memory in electronic communication with the one or more processors; and instructions stored in the memory, the instructions being executable by the one or more processors to:

receive metadata for a plurality of virtual machines, the metadata indicating a metric of priority for the plurality of virtual machines;

allocate a first set of virtual machines from the plurality of virtual machines to a first priority pool on a first set of server nodes based on a first metric of priority associated with the metadata of the first set of virtual machines, the first set of server nodes being implemented on one or more server racks of a cloud computing system, wherein the first metric of priority is associated with a first level of tolerance for performing one or more power shaving actions on the first set of server nodes having the first set of virtual machine implemented thereon;

allocate a second set of virtual machines from the plurality of virtual machines to a second priority pool on a second set of server nodes based on a second metric of priority associated with the metadata of the second set of virtual machines, the second set of server nodes being implemented on the one or more server racks, wherein the second metric of priority is associated with a second level of tolerance for performing the one or more power shaving actions on the second set of server nodes having the second set of virtual machines implemented thereon;

identify an upcoming limited power event associated with limited power capacity of the one or more server racks for a duration of time;

determine server nodes of the one or more server racks on which to perform the one or more power shaving actions, wherein determining the server nodes includes identifying the first set of server nodes based on the first level of tolerance associated with the first set of server nodes being higher than the second level of tolerance associated with the second set of server nodes; and implement the one or more power shaving actions on the first set of server nodes, wherein implementing the one or more power shaving actions on the first set of server nodes causes the one or more server racks to operate within the limited power capacity associated with the upcoming limited power event.

12. The system of claim 11, wherein allocating the first set of virtual machines and the second set of virtual machines into respective priority pools is based on the metadata indicating one or more of:

a level of priority of one or more owners of the plurality of virtual machines; or a level of service availability of the plurality of virtual machines relative to one or more threshold levels of service availability.

13. The system of claim 11, wherein determining one or more power shaving actions comprises:

determining that the first set of virtual machines is associated with a first level of service availability; and determining that the second set of virtual machine is associated with a second level of service availability, and wherein implementing the one or more power shaving actions on the first set of server nodes comprises performing the one or more power shaving actions on the first set of server nodes without performing the one or more power shaving actions on the second set of server nodes based at least in part on the first level of service availability being lower than the second level of service availability.

14. The system of claim 11, wherein the one or more power shaving actions including power shedding, wherein the first level of tolerance indicates a tolerance for performing power shedding on the first set of server nodes while the second level of tolerance indicates an intolerance for performing power shedding on the second set of server nodes.

15. The system of claim 11, wherein the associated impact of performing the one or more power shaving actions is associated with an ability of a given virtual machine to tolerate performing a first type of power shaving action while not being able to tolerate a second type of power shaving action, and wherein allocating the first set of virtual machines to the first priority pool is based on the first set of virtual machines having an ability to tolerate performing the first type of power shaving action while not being able to tolerate the second type of power shaving action.

16. The system of claim 11, wherein the one or more power shaving actions includes power shedding and power capping, wherein the first level of tolerance indicates a tolerance of performing both power capping and power shedding, wherein the second level of tolerance indicates a tolerance of performing power capping and an intolerance of power shedding.

17. A non-transitory computer readable medium storing instructions thereon that, when executed by one or more processors, cause one or more server devices to:

receive metadata for a plurality of virtual machines, the metadata indicating a metric of priority for the plurality of virtual machines;

allocate a first set of virtual machines from the plurality of virtual machines to a first priority pool on a first set of server nodes based on a first metric of priority associated with the metadata of the first set of virtual machines, the first set of server nodes being implemented on one or more server racks of a cloud computing system, wherein the first metric of priority is associated with a first level of tolerance for performing one or more power shaving actions on the first set of server nodes having the first set of virtual machine implemented thereon;

allocate a second set of virtual machines from the plurality of virtual machines to a second priority pool on a second set of server nodes based on a second metric of priority associated with the metadata of the second set of virtual machines, the second set of server nodes being implemented on the one or more server racks, wherein the second metric of priority is associated with a second level of tolerance for performing the one or more power shaving actions on the second set of server nodes having the second set of virtual machines implemented thereon;

identify an upcoming limited power event associated with limited power capacity of the one or more server racks for a duration of time;

determine server nodes of the one or more server racks on which to perform the one or more power shaving actions, wherein determining the server nodes includes identifying the first set of server nodes based on the first level of tolerance associated with the first set of server nodes being higher than the second level of tolerance associated with the second set of server nodes; and implement the one or more power shaving actions on the first set of server nodes, wherein implementing the one or more power shaving actions on the first set of server nodes causes the one or more server racks to operate within the limited power capacity associated with the upcoming limited power event.

18. The non-transitory computer readable medium of claim 17, wherein determining one or more power shaving actions comprises:

determining that the first set of virtual machines is associated with a first level of service availability; and determining that the second set of virtual machine is associated with a second level of service availability, and wherein implementing the one or more power shaving actions on the first set of server nodes comprises performing the one or more power shaving actions on the first set of server nodes without performing the one or more power shaving actions on the second set of server nodes based at least in part on the first level of service availability being lower than the second level of service availability.

19. The non-transitory computer readable medium of claim 17, wherein the one or more power shaving actions including power shedding, wherein the first level of tolerance indicates a tolerance for performing power shedding on the first set of server nodes while the second level of tolerance indicates an intolerance for performing power shedding on the second set of server nodes.

20. The non-transitory computer readable medium of claim 17, wherein the associated impact of performing the one or more power shaving actions is associated with an ability of a given virtual machine to tolerate performing a first type of power shaving action while not being able to tolerate a second type of power shaving action, and wherein allocating the first set of virtual machines to the first priority pool is based on the first set of virtual machines having an ability to tolerate performing the first type of power shaving action while not being able to tolerate the second type of power shaving action.

* * * * *